(12) United States Patent
Godfrey et al.

(10) Patent No.: US 9,594,002 B2
(45) Date of Patent: Mar. 14, 2017

(54) CONDUIT MONITORING

(75) Inventors: Alastair Godfrey, Malvern (GB);
Philip Newton Winder, Malvern (GB)

(73) Assignee: OPTASENSE HOLDINGS LIMITED (GB)

( * ) Notice: Subject to any disclaimer, the term of this patent is extended or adjusted under 35 U.S.C. 154(b) by 378 days.

(21) Appl. No.: 14/000,448

(22) PCT Filed: Mar. 1, 2012

(86) PCT No.: PCT/GB2012/000211
§ 371 (c)(1),
(2), (4) Date: Aug. 20, 2013

(87) PCT Pub. No.: WO2012/117223
PCT Pub. Date: Sep. 7, 2012

(65) Prior Publication Data
US 2013/0333474 A1 Dec. 19, 2013

(30) Foreign Application Priority Data
Mar. 1, 2011 (GB) .................................. 1103479.0

(51) Int. Cl.
*G01M 3/24* (2006.01)
*G01M 3/38* (2006.01)
(Continued)

(52) U.S. Cl.
CPC .............. *G01M 3/243* (2013.01); *G01M 3/38* (2013.01); *G01M 5/0025* (2013.01); *G01M 5/0091* (2013.01); *G01M 11/085* (2013.01)

(58) Field of Classification Search
CPC .................................. G01M 3/243; G01M 3/38
(Continued)

(56) References Cited

U.S. PATENT DOCUMENTS

| 7,764,363 | B2 | 7/2010 | Hayward et al. |
| 2009/0132183 | A1* | 5/2009 | Hartog ............... G01D 5/35303 702/42 |

(Continued)

FOREIGN PATENT DOCUMENTS

| CN | 1598516 | 3/2005 |
| CN | 1837674 | 9/2006 |

(Continued)

OTHER PUBLICATIONS

Nikles, "Long-Distance Fiber Optic Sensing Solutions for Pipeline Leakage, Intrusion and Ground Movement Detection", Proc. of SPIE. vol. 7316, pp. 1-13 (2009).

(Continued)

*Primary Examiner* — John Chapman, Jr.
(74) *Attorney, Agent, or Firm* — McDonnell Boehnen Hulbert & Berghoff LLP (57) ABSTRACT

The present invention relates to a method of monitoring a fluid carrying conduit, comprising interrogating an optic fiber positioned along the path of the conduit to provide distributed acoustic sensing, measuring by distributed acoustic sensing the acoustic signal at each of a plurality of discrete longitudinal sensing portions along the length of the optic fiber, to monitor the optic fiber for the presence of a first characteristic signal, the first characteristic signal being indicative of ground heave the vicinity of the optic fiber, and determining that a failure has occurred in the conduit when a first characteristic signal is measured in the distributed acoustic sensing.

26 Claims, 3 Drawing Sheets

(51) Int. Cl.
*G01M 5/00* (2006.01)
*G01M 11/08* (2006.01)

(58) Field of Classification Search
USPC .......................................... 73/592; 385/12, 13
See application file for complete search history.

(56) References Cited

U.S. PATENT DOCUMENTS

| 2010/0027235 A1 | 2/2010 | Samuelson |
| 2011/0149688 A1* | 6/2011 | Hill ........................... F17D 5/06 367/87 |

FOREIGN PATENT DOCUMENTS

| JP | 08-219935 | 8/1996 |
| WO | WO03/078932 | 9/2003 |
| WO | WO2004/063623 | 7/2004 |
| WO | WO2007/104915 | 9/2007 |
| WO | WO2009/158630 | 12/2009 |
| WO | WO2010/020781 | 2/2010 |
| WO | WO20100207696 | 2/2010 |

OTHER PUBLICATIONS

Zhou Yan, "Study on Distributed Optical Fiber Pipeline Safe Detection Technology", Chinese Selected Doctoral Dissertations and Master's Theses, Full-Text Databases (PhD) Engineering Technology, Part II, 5th issue, May 15, 2007.

* cited by examiner

CONDUIT MONITORING

FIELD OF THE INVENTION

The present invention relates to conduit monitoring, in particular, it relates to pipeline monitoring.

BACKGROUND OF THE INVENTION

Pipelines are widely used to transport fluid assets such as oil and gas, and a large network of such pipelines exists for the distribution of these assets throughout the world. Given the high value of these fluid assets, the importance of the continued operation of these pipelines and the potential environmental impact of a pipeline, the early and accurate detection of pipeline failures is a primary concern for pipeline operators.

It is therefore desirable to provide an improved pipeline monitoring system and method that is capable of accurately monitoring a pipeline to accurately detect any failures of the pipeline.

SUMMARY OF THE INVENTION

According to an aspect of the present invention, there is provided a method of monitoring a fluid carrying conduit, comprising: interrogating an optic fibre positioned along the path of said conduit to provide distributed acoustic sensing; monitoring the acoustic signal at a plurality of discrete longitudinal sensing portions along the length of the optic fibre for the presence of a first characteristic signal, the first characteristic signal being indicative of ground heave in the vicinity of the optic fibre; and determining that a failure has occurred in said conduit when a first characteristic signal is detected in the distributed acoustic sensing.

The method may further comprise determining the location of the failure in the conduit by determining the position of origin of the first characteristic signal in the optic fibre.

The first characteristic signal may comprise a variation in a low frequency component of the acoustic response from a sensing portion of the optical fibre, for example a response at a frequency of lower than a few hundred Hz say, e.g. lower than 500 Hz or lower than 100 Hz. In some embodiments the low frequency response of interest may be of the order of a few tens of Hz or lower, say lower than 50 Hz or lower than 10 Hz. For the purposes of this specification the term low frequency response shall be taken to include the response at DC.

The method may also comprise determining the extent of the variation in low frequency response and estimating the leak flow rate.

The method may further comprise introducing a time varying pressure variation into the fluid in the pipeline; and correlating the acoustic signal at said plurality of discrete longitudinal sections with the time varying pressure signal to determine said first characteristic signal.

The method may further comprise monitoring the acoustic signal at a plurality of discrete longitudinal sensing portions along the length of the optic fibre for the presence of a second characteristic signal, the second characteristic signal being indicative of a pressure wave in the conduit, the pressure wave moving along the conduit in both directions away from the failure site; determining that a failure has occurred in said conduit when a second characteristic signal is measured in the distributed acoustic sensing, if the first characteristic signal correlates with the second characteristic signal. The correlation may include determining the position of origin of the first characteristic signal in the optic fibre, determining the position of origin of the second characteristic signal in the optic fibre, and comparing the first and second positions. A failure may be determined to have occurred when the first and second positions are determined to be within a predetermined range. The predetermined range may be less than 50 m.

The method may further comprise monitoring the acoustic signal at each of a plurality of discrete longitudinal sensing portions along the length of the optic fibre for the presence of a third characteristic signal, the third characteristic signal being indicative of the noise of fluid escaping from the conduit; and determining that a failure has occurred in the conduit when a third characteristic signal is measured by a discrete acoustic sensor, if the third characteristic signal correlates with the first and/or second characteristic signals.

The third characteristic signal may be a signal corresponding to audible hissing sound. The correlation may includes determining the position of origin of the third characteristic signal, based on which longitudinal sensing portion detected the third characteristic signal; determining the position of origin of the first characteristic signal in the optic fibre, and/or determining the position of origin of the second characteristic signal in the optic fibre, and comparing the determined third position with either the first and/or second positions. A failure may be determined to have occurred when the third position and the first and/or second positions are determined to be within a predetermined range. The predetermined range may be less than 50 m.

The method may also comprise correlating the acoustic signals detected by distributed acoustic sensing with measurement signals detected by at least one other sensor apparatus.

The method may also comprise monitoring the fluid carrying conduit, the monitoring comprising: introducing a pressure wave into the conduit; monitoring the response to said pressure wave at each of a plurality of discrete longitudinal sensing portions of the distributed acoustic sensor; deriving from said plurality of measurements a conduit condition profile; deriving one or more further conduit condition profiles by introducing further pressure waves into the conduit; and comparing the conduit condition profiles to determine a change in conduit characteristics.

The method may further comprise monitoring the acoustic signal at each of a plurality of discrete longitudinal sensing portions along the length of the optic fibre in response to an acoustic stimulus for the presence of a fourth characteristic signal, the fourth characteristic signal being indicative of a change in flow rate; and determining that a failure has occurred in the conduit when a fourth characteristic signal is measured by a discrete acoustic sensor, if the third characteristic signal correlates with the first and/or second characteristic signals. The method may comprise analysing the rate of propagation of a pressure pulse in the conduit to detect a sudden change in propagation speed.

The method may comprise determining the longitudinal location of the change in conduit characteristics.

The method may further comprise comparing the longitudinal location of the change in conduit characteristics with a location of failure determined by sensing the ground heave in the vicinity of the optic fibre, and/or a location of a failure determined by sensing the presence of a pressure wave in the conduit, and/or a location of a failure determined by sensing an audible hissing sound by a discrete acoustic sensor, and determining a failure in the has occurred when two or more of the locations are determined to be within a predetermined range.

The optic fibre may be located inside said conduit. The optic fibre may be located adjacent to said conduit. The spatial resolution of said distributed fibre optic sensor may be less than or equal to 25 m. The length of said distributed fibre optic sensor may be greater than or equal to 20 km.

According to another aspect of the present invention, there is provided a conduit monitoring apparatus, comprising: an optic fibre interrogator adapted to interrogate an optic fibre deployed along the path of a conduit and provide distributed acoustic sensing; and a processor adapted to receive sensed data from said interrogator to monitor the optic fibre for the presence of a first characteristic signal, the first characteristic signal being indicative of ground heave the vicinity of the optic fibre, and to determine that a failure has occurred in said conduit when a first characteristic signal is measured in the distributed acoustic sensing.

The apparatus may comprise a pipeline monitoring apparatus.

The processor may be adapted to correlate said sensed data with a time varying pressure variation introduced into the conduit so as to determine said first characteristic signal.

The processor may be further adapted to receive sensed data from said interrogator to monitor the optic fibre for the presence of a second characteristic signal, the second characteristic signal being indicative of a pressure wave in the conduit, the pressure wave moving along the conduit in both directions away from the failure site, and to determine that a failure has occurred in said pipeline when a second characteristic signal is measured in the distributed acoustic sensing, if the first characteristic signal correlates with the second characteristic signal.

The pipeline monitoring apparatus may further comprise an array of discrete acoustic sensors distributed along the path of said conduit, e.g. pipeline; and the processor is adapted to receive data from the discrete acoustic sensors to monitor for the presence of a third characteristic signal, the third characteristic signal corresponding to an audible hissing sound, and to determine that a failure has occurred in said pipeline when a third characteristic signal is detected by a discrete acoustic sensor, if the third characteristic signal correlates with the first and/or second characteristic signals.

The conduit monitoring apparatus may additionally comprise means for introducing time varying pressure variations into the fluid in the conduit, e.g. pipeline. The means for introducing time varying pressure variations into the fluid in the pipeline may be adapted to produce pressure pulses in the fluid contained in a pipeline; and the processor may be adapted to receive sensed data from said interrogator in response to said pressure pulses and to derive a pipeline condition profile from said sensed data and to derive one or more further conduit condition profiles by introducing further pressure waves into the pipeline, to comparing the conduit condition profiles to determine a change in conduit characteristics, and to determine that a failure has occurred in said pipeline when it is determined that there is a change in the pipeline condition profiles.

There is also provided a computer program comprising computer executable instructions, which when executed by a computer, cause the computer to perform the above method.

The invention may comprise any combination of the features and/or limitations referred to herein, except combinations of such features as are mutually exclusive.

DESCRIPTION OF THE DRAWINGS

Embodiments of the present invention will now be described, by way of example, with reference to the accompanying drawings, in which.

DESCRIPTION OF THE INVENTION

Embodiments of the present invention use distributed acoustic sensing (DAS) to provide leak detection for conduits. Distributed acoustic sensing is a known type of sensing where an optical fibre is deployed as a sensing fibre and repeatedly interrogated with electromagnetic radiation to provide sensing of acoustic activity along its length. Typically one or more input pulses of radiation are launched into the optical fibre. By analysing the radiation backscattered from within the fibre, the fibre can effectively be divided into a plurality of discrete sensing portions which may be (but do not have to be) contiguous. Within each discrete sensing portion mechanical disturbances of the fibre, for instance due to incident acoustic waves, cause a variation in the properties of the radiation which is back-scattered from that portion. This variation can be detected and analysed and used to give a measure of the intensity of disturbance of the fibre at that sensing portion. Thus the DAS sensor effectively acts as a linear sensing array of acoustic sensing portions of optical fibre. The length of the sensing portions of fibre is determined by the characteristics of the interrogating radiation and the processing applied to the backscatter signals but typically sensing portions of the order of a few meters to a few tens of meters or so may be used. As used in this specification the term "distributed acoustic sensing" will be taken to mean sensing by interrogating an optical fibre to provide a plurality of discrete acoustic sensing portions distributed longitudinally along the fibre and the term "distributed acoustic sensor" shall be interpreted accordingly. The term "acoustic" shall mean any type of pressure wave or mechanical disturbance that may result in a change of strain on an optical fibre and for the avoidance of doubt the term acoustic be taken to include ultrasonic and subsonic waves as well as seismic waves.

Figure 1:
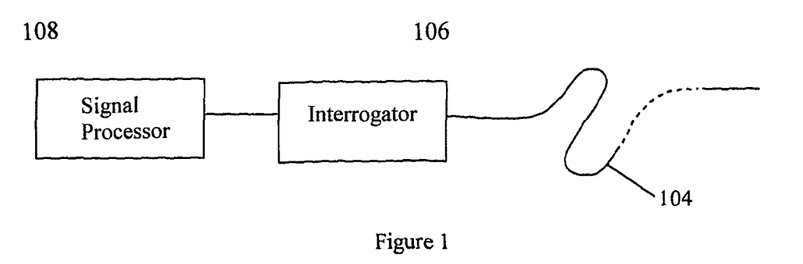
FIG. 1 illustrates the basic components of a distributed fibre optic sensor.

FIG. 1 shows a schematic of a distributed fibre optic distributed acoustic sensing (DAS) arrangement. A length of sensing fibre 104, which may be standard optic fibre such as used in telecommunication applications, is connected at one end to an interrogator 106. The output from interrogator 106 is passed to a signal processor 108 and optionally a user interface, which in practice may be realised by an appropriately specified PC. The sensing fibre can be many kilometers in length, and in this example is approximately 40 km long.

The interrogator 106 launches an interrogating optical signal, which may for example comprise a series of pulses having a selected frequency pattern, into the sensing fibre. In one embodiment of a DAS sensor the phenomenon of Rayleigh backscattering results in some fraction of the light input into the fibre being reflected back to the interrogator, where it is detected to provide an output signal which is representative of acoustic disturbances in the vicinity of the fibre. The form of the optical input and the method of detection allow a single continuous fibre to be spatially resolved into discrete sensing lengths. That is, the acoustic signal sensed at one sensing length can be provided substantially independently of the sensed signal at an adjacent length. The spatial resolution in the present example is approximately 10 m, resulting in the output of the interrogator taking the form of 4000 independent data channels. DAS sensors based on other types of scattering are also known.

The distributed acoustic sensor may, for instance, by a distributed acoustic sensor such as described in GB patent application publication No. 2,442,745, the contents of which are hereby incorporated by reference thereto. The distributed acoustic sensor as described in GB2,442,745 determines acoustically induced strains on the optical fibre by determining the phase change on the optical fibre. Using a phase change in the optical fibre as a measure of disturbances allows low frequency strains on the optical fibre to be detected which is particularly advantageous in the embodiments of the present invention.

In this way, the single sensing fibre can provide sensed data which is analogous to a multiplexed array of adjacent sensors, arranged in a linear path, which may be straight or curved depending on the application.

Figure 2:
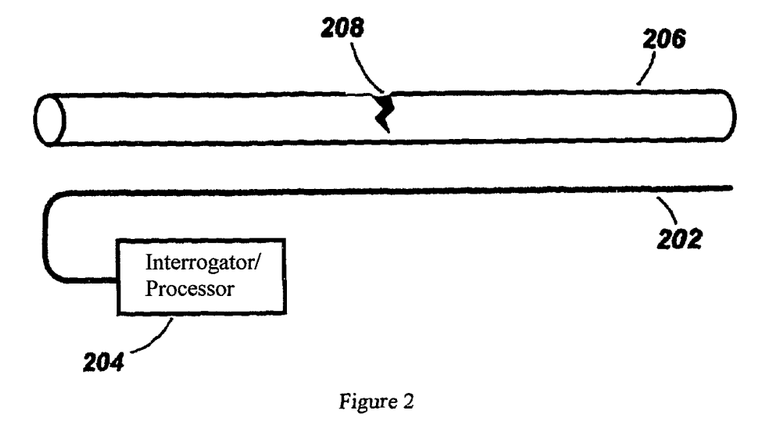
FIG. 2 shows a fibre sensor arranged along a length of pipeline.

FIG. 2 shows an arrangement according to the present invention, whereby a sensing fibre 202 (and associated interrogator and/or processor 204) is arranged along the path of a conduit, which in this example is a pipeline 206. Acoustic signals incident on the sensing portions of optical fibre can be detected. For example, pressure pulses travelling along the pipeline 206 can be detected by the sensing fibre 202 and the pressure pulses will cause a localised change in the strain of the sensing fibre, which will in turn affect the characteristics of backscattered radiation at that point in the sensing fibre.

The fibre is preferably arranged to follow the path of the pipeline. In this way the various discrete sensing portions of fibre correspond directly to longitudinal section of pipe. However other fibre arrangements may be used—in which case it may be necessary to know the arrangement of the fibre relative to the pipeline to allow tracking within the pipeline. The fibre may be positioned inside or outside of the conduit and may or may not be in direct contact with the walls of the pipe.

Figure 3:
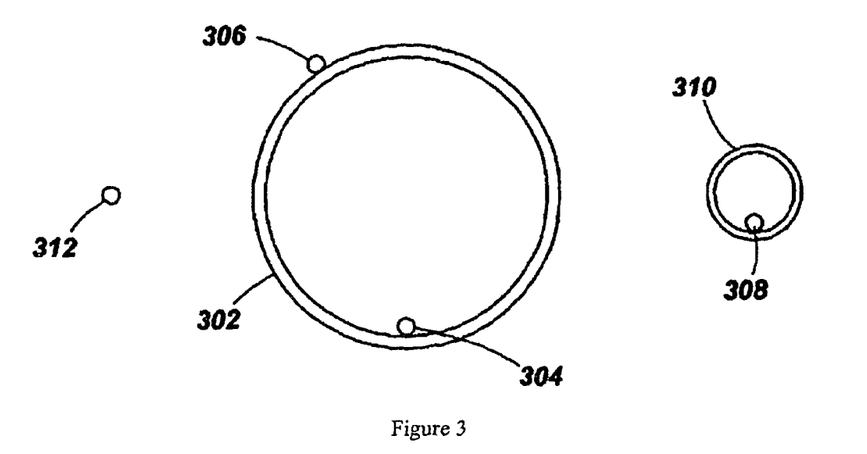
FIG. 3 shows a cross section of a pipeline and sensing fibres.

FIG. 3 shows a cross section of a pipe 302 with possible locations of a sensing fibre able to detect the response of the pulse in the pipe.

The pipe in the present example has an internal diameter of 1200 mm and 50 mm carbon steel walls, carrying natural gas at approximately 80 bar. The pipe may be buried approximately 1-2 m below the surface which may be ground level or the seabed in certain situations. Fibre 304 illustrates a fibre located inside the interior bore of the pipe 302, resting on the bottom of the pipe. Fibre 306 illustrates a fibre bonded to the exterior of the pipe, while fibre 308 illustrates a fibre located in a separate cable carrying conduit 310, located approximately 1.5 m from the centreline of the gas transmission pipeline. Conduit 310 is typically laid at the time of installing the pipeline to carry communication and/or SCADA lines. Fibre 312 illustrates a fibre directly buried in the ground alongside the pipeline, at approximately 1 m from the pipe centreline.

It will be understood that for each different fibre placement, the measured response to acoustic signals originating from within the pipe will be different, and will depend on different factors. The signal sensed by fibre 308 will depend on the transfer characteristics of the ground between pipe 302 and conduit 310, for example, while sensing fibres 304 and 306 will be less affected.

The fibre preferably extends along the length of pipeline it is wished to track. Distributed acoustic sensing has been demonstrated in fibre lengths of up to and beyond 40 km. Thus a single distributed acoustic sensor can provide monitoring over 40 km of pipeline. A series of distributed acoustic sensors could be arranged to provide monitoring over longer lengths of pipeline. For lengths of pipeline of the order of 80 km or so a single fibre could be used along the length of the fibre with a distributed acoustic sensor arranged at each end of the fibre. For shorter lengths of pipeline however the fibre path may double back along the pipeline to provide additional sensors for monitoring.

Referring back to FIG. 2, pipeline 206 is shown with a failure 208 at a position along the length of the pipeline 206. The failure 208 may be a fracture in the pipe walls or any other failure that may lead to the loss of fluid assets such as oil/gas from the pipeline.

Failure 208 will cause oil/gas to flow from the pipeline 206 to leak into the ground surrounding the pipeline in which the pipeline is buried. This leaked oil/gas will cause a localised swelling or movement of the ground, referred to as heave, as the oil/gas collects or flows into the environment. This effect will be particularly evident in conduits where fluid is carried at high pressure, for instance a gas pipeline in which gas is transmitted down the pipeline at high pressure to increase flow rates. High pressure gas on leaking from the pipeline will expand rapidly in the ground casing ground heave. Oil pipelines may also be pressured and large volumes of oil flowing into the ground may cause significant ground heave.

The localised ground heave in the vicinity of the pipeline failure will cause localised strain to be applied to the optic fibre 202. This strain on the optic fibre will cause a change in the scattering sites within the fibre and in a sensor such as described in GB2,442,745 will cause a change in path length leading to a detectable change in phase from the relevant section of the fibre.

Therefore, by interrogating optic fibre 202, ground heave can be detected using distributed acoustic sensing, by detecting the characteristic signal caused by the ground heave. This would typically be a relatively intense low frequency signal on the relevant sensing portion or portions of the optic fibre. Depending on the length of the sensing portions of fibre the effects of ground heave may be localised to only a few sections of fibre.

As mentioned the effect of ground heave will typically be detected as a variation in the low frequency component of the signals detected from a DAS sensor. The ground heave may result in a continuous change in strain which will be reflected in the low frequency signals of the DAS sensor. The low frequency response will be the response at frequencies lower than a few hundred Hz say and the response of most interest may be at frequencies of the order of a few tens of Hz or lower, say lower than 50 Hz or lower than 10 Hz. For the avoidance of doubt, as used in this specification the term low frequency response shall be taken to include the response at DC which can be indicative of the continuous strain on the fibre.

The signal processor may therefore analyse the detected acoustic signals and look for any significant change in low frequency response as being indicative of a significant relatively continuous change in strain on the optical fibre which may be indicative of ground heave.

In order to demonstrate the ability to detect pipeline leaks by using DAS to detect signals indicative of ground heave a gas pipeline failure event was simulated. A vessel resembling a section of conduit was buried in the ground in fluid communication with supply of compressed gas. A bursting membrane, i.e. a membrane designed to burst when a specified pressure level is reached, was located over an aperture in the conduit. The vessel was slowly pressurised with compressed gas until the bursting threshold pressure (in this example 70 bar or $7 \times 10^6$ Pa) was reached and the bursting membrane ruptured. This simulated a sudden leak in a pressurised gas pipeline. A fibre optic cable was buried in the vicinity of the test vessel and interrogated with a DAS interrogator.

Figure 5:
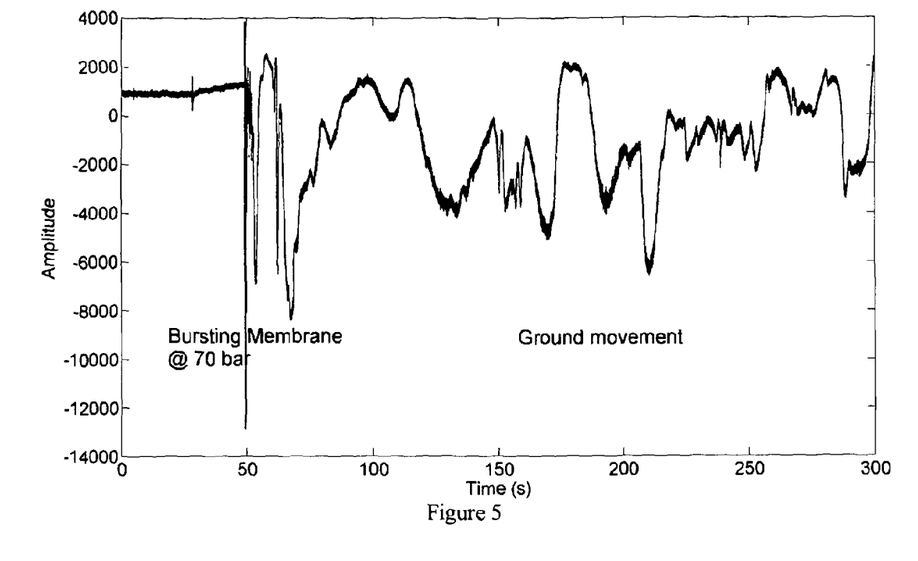
FIG. 5 shows data from a DAS sensor in response to a simulated gas pipeline leak.

FIG. 5 shows the low frequency response of the detected acoustic signals as the vessel was pressurised and the bursting threshold reached. FIG. 5 shows the general intensity of the low frequency signal against time. It can be seen that before the bursting pressure threshold is reached (at around 50 s) the low frequency signal is relatively constant and exhibits only relatively small changes occurring gradually over time. As the membrane bursts however there is a large swing in detected signal with a rapid change in detected intensity which lasts for a significant length of time.

The data shown in FIG. 5 was acquired using a DAS sensor with a relatively limited dynamic range and without significant linearity between incident strain and resultant detected intensity. As the skilled person will appreciate the intensity of backscatter from any given sensing portion of optical fibre depends on the random backscatter from that given sensing portion and also on the path length variations caused by the incident strain. In DAS sensor without phase lock, i.e. the change in phase of the measurement signal is not tracked accurately, large change in strains can exceed the dynamic range of the sensor.

Figure 6A:
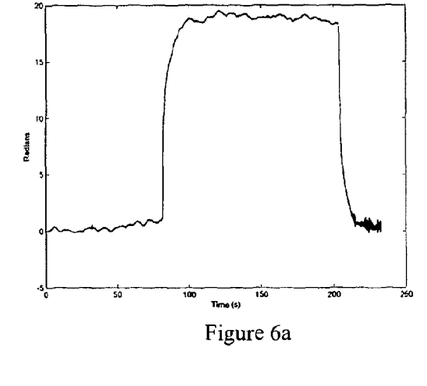
FIGS. 6a-c show data from further trials.
Figure 6B:
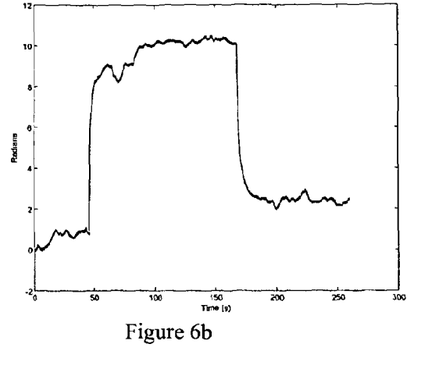
Figure 6C:
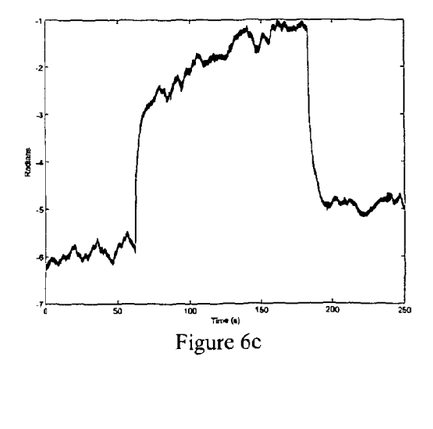

FIGS. 6a-c show data acquired from pressurised gas being released into the ground which was detected by a DAS sensor which determines the phase of the measured acoustic signal. FIG. 6a shows the returns detected when the flow rate to the vessel is 100 Standard liters per minute (SLPM). Again it can be seen that before rupture the low frequency response is relatively constant with only relatively low variations. When rupture happens there is a sudden increase in strain which is then sustained. This corresponds to the ground heave leading to an increased continuous strain. At about 200 s the flow is stopped and the increased intensity at low frequency drops quickly back to about the previous level. FIG. 6b shows the result from a similar trial but with a flow rate of 50 SLPM. It can be seen that the same general pattern is detected but the relative increase in intensity of low frequency signal is about half that as compared to the data shown in FIG. 6a. FIG. 6c shows data from a further trial which used a flow rate of 25 SLPM. Again the same pattern can be observed, although the ground heave is not so rapid due to the reduced flow rate. The maximum increase in intensity is about half that observed in the data shown in FIG. 6b.

This data shows that ground heave resulting from pressurised fluid escaping into the ground can be detected from the low frequency response of a DAS sensor. Further it can be seen that in a DAS sensor with phase lock the detected change in intensity is quantatively related to the flow rate and hence the amount of ground heave.

Thus when a sudden increase in low frequency response is detected and used to indicate a leak the severity of the leak, i.e. the leak flow rate, may be estimated by looking at the change in detected intensity of the DAS sensor.

A potential limitation of this method is that if the failure of the pipeline leads to a slow leak of fluid into the surrounding ground, it may be difficult to distinguish the ground heave caused by the leak from natural variations in the ground such as may be caused by solar heating or water absorption into the ground, such as rain, particularly if the ground is approaching saturation. Thermal variations of the optic fibre may also lead to signals similar to those due to ground heave. Further even if a new leak causes a sudden, significant heave which may be detectable above normal ambient noise, such an event may be a one time event. As long as the leak continues the continual flow of fluid into the ground may maintain the level of ground heave. Alternatively the fluid will tend to find some escape route and the ground may slowly subside to some steady state position. Thus the signal due to ground heave in the event of a leak may be a one time change in the acoustic response from the fibre.

It may therefore be desirable to use additional metrics to more accurately identify whether or not a failure in a pipeline has occurred.

One other method may be to monitor the pipeline for a pressure pulse in the pipeline that may be caused by a sudden crack/failure or leak in the pipeline 206. This resulting pressure pulse caused by the sudden failure can be detected by the sensing fibre 202 and can be used to identify and/or locate the source and hence the location of the failure 208.

The pressure pulse generated by the failure 208 will travel in both directions down the pipe, away from the failure site. The pipeline 206 acts as a waveguide and this pressure pulse can travel for tens of kilometers without being unduly attenuated.

As the pressure pulse passes through any particular length of pipe, it creates an acoustic disturbance which can be detected by the distributed fibre sensor 202/204.

Figure 4:
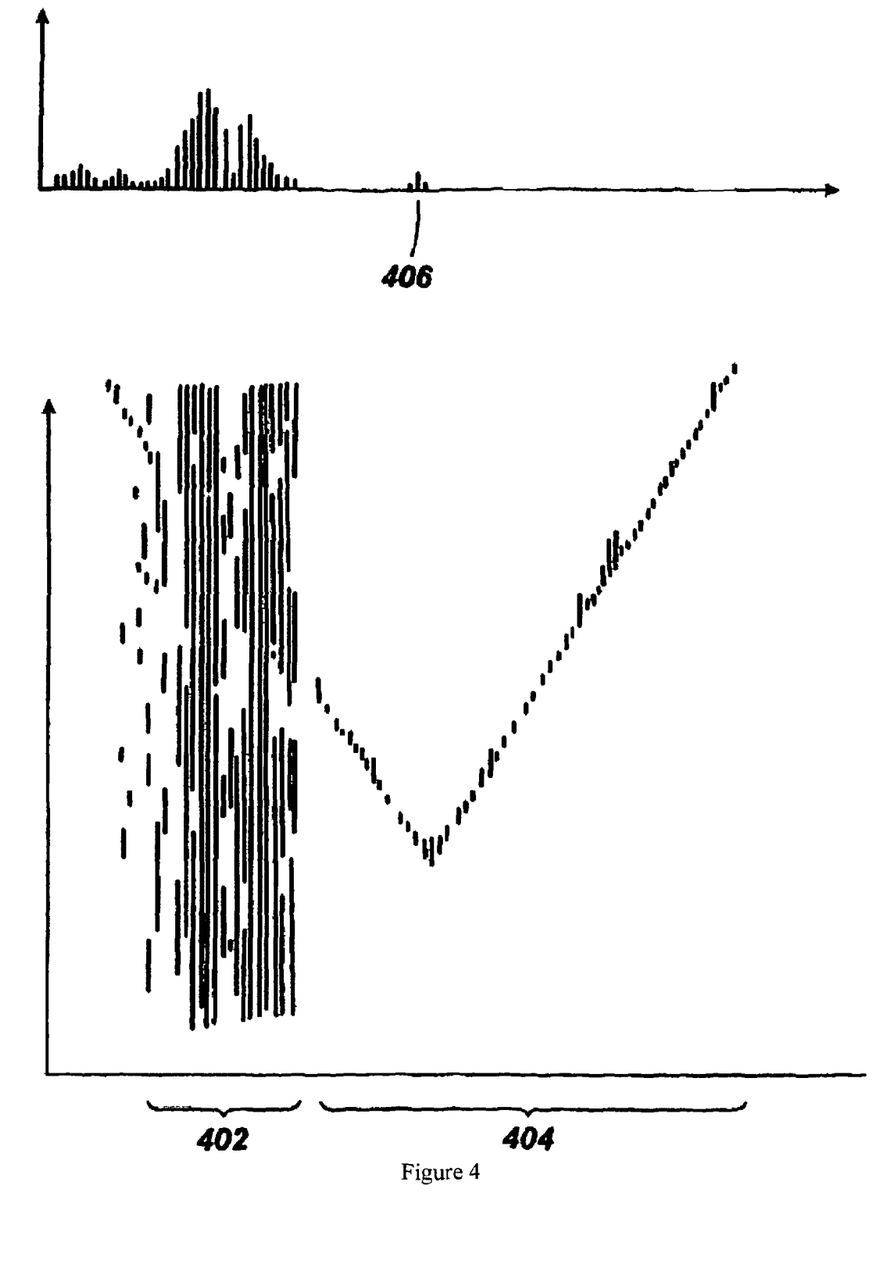
FIG. 4 shows pipeline monitoring data outputs.

FIG. 4 shows a histogram and associated waterfall plot illustrating a distributed fibre sensor output in response to a pressure pulse propagating in an adjacent pipeline. Data in FIG. 4 was produced by a sensing fibre in a conduit. The x-axis of the histogram and waterfall plot is the position along the length of the sensing fibre (which is this case has an overall length of approximately 40 km). As the fibre has a path which follows the pipeline the x-axis also corresponds to position along the pipeline.

The histogram shows, at an instant in time, the amplitude of the sensed acoustic signal returned from the sensing fibre. In order that all 4000 channels can be viewed, each bar in the diagram represents the peak amplitude from a group of 10 m sections. Individual 10 m sections could be viewed if desired. The lower plot is a representation of a waterfall plot with an update rate of 0.05 seconds showing sound intensity against distance and time. Time is plotted along the y-axis of the waterfall, with most recent data plotted at the top. The x-axis is again distance along the fibre, and hence pipeline, and the sound intensity. For the purposes of explanation here, it can be taken that the waterfall of FIG. 4 shows acoustic disturbance as a function of distance along the fibre against time.

Two main features can be seen from the waterfall plot. The first is an area of constant acoustic disturbance towards the left of the plot at 402, corresponding to a length of approximately 4000 m of the sensing fibre. This is attributable to an industrial unit located over that section of fibre, producing a steady vibrational noise. Secondly a distinct chevron (i.e. V shaped) pattern can be seen, most clearly in region 404, away from the constant noise of the industrial unit. This chevron pattern is a characteristic signal of the presence of a pressure wave propagating in the pipeline.

The vertex of the chevron is located at point 406 along the fibre, corresponding to the origin of the pressure pulse, which, for a pressure pulse due to a failure of the pipeline would correspond to the site of the failure 208. The 'V' shape of the plot corresponds to pressure pulses moving along the pipe in both directions away from the source of the impulse, and the slope of the 'V' shape corresponds to the speed of sound in the pressurised fluid contained within the pipe which in this case is approximately 400 ms$^{-1}$ (assuming that the acoustic channels of the optic fibre are distributed evenly along the path of the pipeline).

It can be seen therefore that pressure pulses caused by sudden pipeline failure are clearly detectable in the pipeline using a distributed acoustic sensor.

The propagation of the pulses in the pipeline may potentially also provide some information about the nature of the leak, i.e. the relative intensity could potentially indicate the severity of the leak. Also any rapid change in flow rate or temperature of the fluid on occurrence of the pipeline failure may influence the propagation speeds of the pressure pulse and thus alter the general shape of the observable 'V' feature in the waterfall diagram.

The V shaped propagation feature in a waterfall plot (or equivalently two moving acoustic disturbances travelling along the pipeline in opposite directions from a common origin) may be used as a detection feature using a relatively simple algorithm, as will be apparent to the skilled person.

In an embodiment of the present invention, in order to detect a failure in a pipeline, a monitoring system may monitor both the ground heave and the presence of a sudden pressure pulse in the pipeline. For instance detection of spontaneous pressure pulses propagating in the pipeline followed by signals indicative of ground heave could be used together to identify a leak with better discrimination than using either technique alone. Such a system may determine the respective origins of the ground heave and the pressure wave and compare the two locations. If the two locations are coincident, or fall within a predetermined range, it can be assumed that the event causing the ground swell and the pressure pulse are linked and hence a failure in the pipeline can be detected with greater certainty. The predetermined range may be 100 m or less and more preferably 50 m or less. The method may also involve comparing the relative time of detection of the pressure pulses and ground heave. Determining the point of origin of the pressure pulses may also comprise determining the time of origin of the pressure pulses. The time at which the pressure pulses were first generated can then be compared with the time at which a signal indicative of ground heave was detected.

Although the above describes the possibility of being able to detect sudden failures in a pipeline, if the failure is a gradual failure, in which a relatively small amount of oil/gas escapes the pipe and seeps into the ground surrounding the failure site of the pipeline, and does not provide a pressure wave down the pipeline large enough to detect, a gradual failure may not be detected.

It may therefore be desirable to utilise additional or alternative metrics to the detection of the characteristic V shape to more accurately identify whether or not a failure in a pipeline has occurred.

One such method may be to detect the noise of the oil/gas escaping from the pipeline. The escape of pressurized oil or gas from the pipeline may create a noise, for instance an audible hissing type sound. Thus detection of ground heave in the same location as detection of an increased and sustained increase in acoustic noise may be indicative of a leak. The noise, e.g. a hissing sound associated with the leak, may be monitored by using an additional array of discrete acoustic sensors (e.g. microphones) located along the path of the pipeline although in preferred embodiments the discrete sensing channels of the discrete acoustic sensor are used to monitor for noise associated with leakage. The method may comprise monitoring for noise signature having a particular frequency for example which is associated with, for example, escape of high pressure gas from a pipeline.

The location of the hissing sound can be determined in a variety of ways, as will be apparent to the skilled person.

In an embodiment of the present invention, in order to detect a failure in a pipeline, a monitoring system may monitor the ground heave, the presence of a sudden pressure pulse in the pipeline and/or the presence of a noise indicative of escape of fluid from the pipeline, such as an audible hissing sound. Such a system may determine the respective origins of the ground heave, the pressure wave and the hissing sound and may compare two or more of the locations. If two or more of the locations are coincident, or fall within a predetermined range, it can be assumed that the event causing the ground swell and the pressure pulse are linked and hence a failure in the pipeline can be detected with greater certainty. The predetermined range may be 100 m or less and more preferably 50 m or less. The time of detection of the signals indicative of the various metrics may also be correlated.

The returns from the distributed acoustic sensor may be processed continually using all of the metrics discussed above. However in some embodiments the returns may be processed initially using only some of these metrics. If, for example, initially a signal indicative of ground heave is detected the returns from the same section of fibre may then be subsequently processed to look for an increased acoustic disturbance indicating fluid escaping from the pipeline and/or the returns from around the time that the possible ground heave was first detected may be processed to look for the propagation of pressure pulses flowing in opposite directions. This may involve buffering all data for at least a short period of time so that, in the event of detection of one metric at a certain location of the fibre the relevant buffered signals for that section of fibre can then be analysed using the other metrics.

Embodiments of the present invention may therefore use one or more metrics indicative of a pipeline failure as part of normal processing, and, if signals indicative of a potential failure are detected then subsequent processing using one or more additional metrics may be performed to help categorise the detection as a pipeline failure or not. Only using some metric initially may reduce the normal processing burden, but clearly the most reliable metrics should be used. For instance, if every significant failure produces a pressure pulse which is detectable (by detecting the two pulses moving in the pipeline in opposite directions from the point of failure) then this may be used as an initial indication of a possible failure. To reduce the possibility of false alarm the detection of a pressure pulse may lead to processing to detect ground heave in the same vicinity and optionally the presence of a noise signal such as hissing.

In some instances the data from the DAS sensor may also be correlated with data from other sensors to detect a leak. Such other sensors may comprise one or more of temperature sensors (such as fibre optic distributed temperature sensors), flow rate monitors (within the conduit) and/or accelerometers or the like. If there is a sudden change in temperature (cooling for escaping pressurised gas, heating for escaping heated oil) or a sudden drop in flow or sudden acceleration and the location and time correlates with any of the DAS metrics this could indicate a leak.

Another method that may be used to more accurately detect the presence of a failure in a pipeline is to introduce a time varying pressure variation into the fluid in the pipeline, e.g. cyclically introduce a pressure wave into the pipeline, and measure the acoustic response to the pressure wave using distributed acoustic sensing. In particular the method may involve monitoring for a corresponding change in the signal indicative of ground heave.

As mentioned above in the presence of a leak in a buried pipeline the escape of pressurized oil or gas into the surrounding ground may cause ground heave but such ground heave may be a one time event. This embodiment of the invention introduces a time varying pressure to the fluid in the pipeline.

As one skilled in the art will appreciate the amount of fluid escaping from the pipeline into the ground due to a leak will depend on the nature of the leak but also on the pressure of the fluid in the relevant section of pipeline. If the pressure within the pipeline is varied in a time varying fashion these pressure variations will tend to propagate along the pipeline. Thus the pressure of the fluid at the section of pipeline having the leak will also vary in substantially the same manner. Thus the amount of fluid flowing into the surrounding ground will also vary which will have a corresponding effect on the amount of ground heave. Thus creating a time variation in the pressure of the fluid within the pipeline may leas to a corresponding time variation in the low frequency strain signal due to the ground heave. Thus be correlating the signals indicative of ground heave with the time variation of the pressure within the pipeline signals due to ground heave from a leak can be discriminated from signals due to background effects, such as weather related ground heave or thermal variation of the optical fibre.

Thus the embodiment may comprise monitoring for signal indicative of ground heave with a time varying component. The method may comprise correlation the signals from the channels of the optical fibre with a signal indicative of the time varying pressure variation in the pipeline.

Varying the pressure of the fluid in the pipeline in this way can be achieved readily by varying the control parameters at pumping stations etc. However clearly the pressure variation should stay within the safe operating limits for the pipeline. The pressure variation may therefore involve periodically reducing the pressure within the pipeline.

The time varying pressure variation may be applied during normal operation of the pipeline in order to allow for the continually monitoring for leaks and thus, as mentioned above, the returns from the optical fibre may be analysed taking the pressure variations into account, i.e. by correlating the low frequency response with the pressure variations. However applying a pressure variation to the pipeline may potentially reduce flow rates and/or the pressure variation within the pipeline may increase the stress on various pipeline components as compared to operation at a relatively steady pressure. Thus, to reduce the amount of pressure variation within the pipeline the pressure variation may only be applied periodically. The pressure variation may be introduced at set intervals in order to check for leaks. For instance, every so often a cyclic pressure variation may be applied to the fluid in the pipeline for a certain test duration. During this time the signals from the acoustic channels of the distributed acoustic sensor may be correlated with the pressure variation to detect a leak. Additionally or alternatively another method may be employed to constantly monitor the pipeline for failure, such as any of the other embodiments described above, and in the event of detection of a possible leak a pressure variation could be introduced into the fluid in the pipeline and correlated with the signals from the distributed acoustic sensor to aid in confirming whether or not a leak has occurred.

In embodiments where pressure variation can be introduced into the fluid in the pipeline in order to determine leaks, the acoustic response to a pressure pulse may additionally be used to determine a condition profile for the pipeline. The method may thus include introducing a pressure pulse into the pipeline and interrogating an optic fibre positioned along the path of the pipeline. By measuring the response to pressure pulse along the pipeline, a pipeline condition profile that is characteristic of the current state of the pipeline can be derived.

By introducing further pressure pulses and deriving further pipeline condition profiles, any changes in the condition of the pipeline can be determined.

If a failure occurs in a pipeline, the measured pipeline characteristics will change. By periodically sending pressure pulses down the pipeline and monitoring the responses to the pressure pulses, any failure in the pipeline can be determined by comparing the current measured pipeline condition profile with the expected pipeline condition profile. The longitudinal location of the change in conduit characteristics can be determined using methods that would be apparent to the skilled person.

In an embodiment of the present invention, in order to detect a failure in a pipeline, a monitoring system may monitor the ground heave, the presence of a sudden pressure pulse in the pipeline and/or the presence of an audible hissing sound and/or the conduit condition profile. Such a system may determine the respective origins of the ground heave, the pressure wave, the audible hissing sound and the location of change in the conduit condition profile and may compare two or more of the locations. If two or more of the locations are coincident, or fall within a predetermined range, it can be assumed that the event causing the ground swell and the pressure pulse are linked and hence a failure in the pipeline can be detected with greater certainty. The predetermined range may be 100 m or less and more preferably 50 m or less.

Monitoring the response to acoustic pressure stimuli introduced into the pipeline may also be used to determine a leak by detecting a change in flow rate within the pipeline. At a leak fluid will be escaping from the pipeline. Thus downstream of a leak the fluid flow rate may be reduced compared to the flow rate upstream of the leak. The flow rate of the fluid will have a small effect on the propagation velocity of any pressure pulse propagating in the fluid of the pipeline. By monitoring the response to an acoustic stimulus in the pipeline the flow rate of the fluid in the pipeline may be monitored and hence any areas of sudden change in flow rate may be used to indicate a leak.

In a relatively simple embodiment the rate of propagation of a pressure pulse along the pipeline may be monitored and any relatively sudden changes in propagation speed may be used as indication of a leak. It will of course be appreciated that a variation in the speed of sound within the fluid in the pipeline, for example due to temperature variations, will lead to a change in the detected propagation velocity of a pressure pulse but such changes may be expected to be relatively gradual. To account for the speed of sound variation the rate of propagation of pulses travelling in both directions in the pipeline may be monitored over the same stretch of pipeline. In this case the speed of sound will be the same for both pulse travelling in the same direction as the flow and the pulse travelling against the flow. There will however be a difference in the rate of propagation in the two directions which is related to the flow speed.

In another embodiment pressure waves at a given frequency may be induced in both directions in the pipeline to create a standing wave. The positions of the nodes and/or antinodes of the standing waves will depend on the frequency and also on the rate of flow. Detecting the distance between the nodes/antinodes in the various sections of the pipeline can therefore indicate the flow speed in such sections.

As will be understood, each of the above described methods for detecting failure in a pipeline can be used in isolation or in any suitable combination to satisfy the sensing requirements on a particular pipeline. Any of the methods described above may also be combined with other, non-acoustic methods for detecting pipeline leaks, for example such as measuring temperature changes and/or using flow rate detectors or the like.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of monitoring a fluid carrying conduit, comprising:
    interrogating an optic fibre positioned along the path of said conduit to provide distributed acoustic sensing;
    monitoring the acoustic signal at a plurality of discrete longitudinal sensing portions along the length of the optic fibre for the presence of a first characteristic signal, the first characteristic signal being indicative of ground heave in the vicinity of the optic fibre;
    determining that a failure has occurred in said conduit when a first characteristic signal is detected in the distributed acoustic sensing;
    monitoring the acoustic signal at a plurality of discrete longitudinal sensing portions along the length of the optic fibre for the presence of a second characteristic signal, the second characteristic signal being indicative of a pressure wave in the conduit, the pressure wave moving along the conduit in both directions away from the failure site; and
    determining that a failure has occurred in said conduit when a second characteristic signal is measured in the distributed acoustic sensing, if the first characteristic signal correlates with the second characteristic signal.

2. The method according to claim 1 wherein the first characteristic signal comprises a
    variation in a low frequency component of the acoustic response from a sensing portion of the optical fibre.

3. The method according to claim 2 further comprising:
    determining the extent of the variation in low frequency response and estimating the leak flow rate.

4. The method according to claim 1, further comprising:
    determining the location of the failure in the conduit by determining the position of origin of the first characteristic signal in the optic fibre.

5. The method according to any preceding claim 1 further comprising:
    introducing a time varying pressure variation into the fluid in the conduit; and
    correlating the acoustic signal at said plurality of discrete longitudinal sections with the time varying pressure signal to determine said first characteristic signal.

6. The method according to claim 1, wherein the correlation includes determining the position of origin of the first characteristic signal in the optic fibre, determining the position of origin of the second characteristic signal in the optic fibre, and comparing the first and second positions.

7. The method according to claim 6, wherein a failure is determined to have occurred when the first and second positions are determined to be within a predetermined range.

8. The method according to claim 7, wherein the predetermined range is less than 50 m.

9. The method according to claim 1, further comprising:
    monitoring the acoustic signal at each of a plurality of discrete longitudinal sensing portions along the length of the optic fibre for the presence of a characteristic signal being indicative of the noise of fluid escaping from the conduit; and
    determining that a failure has occurred in the conduit when a characteristic signal being indicative of the noise of fluid escaping from the conduit is measured by a discrete acoustic sensor, if the characteristic signal being indicative of the noise of fluid escaping from the conduit correlates with the first characteristic signal.

10. The method according to claim 9, wherein the third characteristic signal corresponds to an audible hissing sound.

11. The method of claim 9, wherein the correlation includes
    determining the position of origin of the third characteristic signal, based on which longitudinal sensing portion detected the third characteristic signal;
    determining the position of origin of the first characteristic signal in the optic fibre, and
    comparing the determined position of origin of the third characteristic signal with the position of origin of the first characteristic signal.

12. The method according to claim 11, wherein a failure is determined to have occurred when the position of origin of the third characteristic signal and the position of origin of the first characteristic signal are determined to be within a predetermined range.

13. The method according to claim 12, wherein the predetermined range is less than 50 m.

14. The method according to claim 1 further comprising monitoring the fluid carrying conduit, said monitoring comprising:
    introducing a pressure pulse into the conduit;
    monitoring the response to said pressure pulse at each of a plurality of discrete longitudinal sensing portions of the distributed acoustic sensor;
    deriving from said plurality of measurements a conduit condition profile;
    deriving one or more further conduit condition profiles by introducing further pressure pulse into the conduit;
    comparing the conduit condition profiles to determine a change in conduit characteristics.

15. A method according to claim 14, comprising determining the longitudinal location of the change in conduit characteristics and correlating the position of the change in conduit characteristic with the position of origin of the first characteristic signal.

16. The method according to claim 1, further comprising:
    monitoring the acoustic signal at each of a plurality of discrete longitudinal sensing portions along the length of the optic fibre in response to an acoustic stimulus for the presence of a characteristic signal being indicative of a change in flow rate; and determining that a failure has occurred in the conduit when a characteristic signal being indicative of a change in flow rate is measured by a discrete acoustic sensor, if the characteristic signal being indicative of a change in flow rate correlates with the first characteristic signal.

17. A method as claimed in claim 1 wherein the method comprises analysing the rate of propagation of a pressure pulse in the conduit to detect a sudden change in propagation speed.

18. The method according to claim 1, wherein the optic fibre is located inside said conduit.

19. The method according to claim 1, wherein the optic fibre is located adjacent to said conduit.

20. The method according to claim 1, wherein the spatial resolution of said distributed fibre optic sensor is less than or equal to 25 m.

21. The method according to claim 1, wherein the length of said distributed fibre optic sensor is greater than or equal to 20 km.

22. A pipeline monitoring apparatus, comprising:
an optic fibre interrogator adapted to interrogate an optic fibre and provide distributed acoustic sensing; and
a processor adapted to receive sensed data from said interrogator to monitor the optic fibre for the presence of a first characteristic signal, the first characteristic signal being indicative of ground heave the vicinity of the optic fibre, and to determine that a failure has occurred in said pipeline when a first characteristic signal is measured in the distributed acoustic sensing; the processor further adapted to receive sensed data from said interrogator to monitor the optic fibre for the presence of a second characteristic signal, the second characteristic signal being indicative of a pressure wave in the conduit, the pressure wave moving along the conduit in both directions away from the failure site and to determine that a failure has occurred in said pipeline when a second characteristic signal is measured in the distributed acoustic sensing if the first characteristic signal correlates with the second characteristic signal.

23. A pipeline monitoring apparatus according to claim 22 wherein the processor is further adapted to correlate said sensed data with a time varying pressure variation introduced into the conduit so as to determine said first characteristic signal.

24. The pipeline monitoring apparatus according to claim 22 wherein
the processor is adapted to receive sensed data from the interrogator to monitor for the presence of a third characteristic signal, the third characteristic signal being an audible hissing sound, and to determine that a failure has occurred in said pipeline when a third characteristic signal is measured by a discrete acoustic sensor, if the third characteristic signal correlates with the first characteristic signal.

25. A pipeline monitoring apparatus as claimed in claim 22 further comprising a means for introducing time varying pressure variations into the fluid in the pipeline.

26. A pipeline monitoring apparatus as claimed in claim 25 wherein:
the means for introducing time varying pressure variations into the fluid in the pipeline is configured to introduce pressure pulses into the fluid in the pipeline; and
the processor is adapted to receive sensed data from said interrogator in response to said pressure pulses and to derive a pipeline condition profile from said sensed data and to derive one or more further conduit condition profiles by introducing further pressure waves into the pipeline, to comparing the conduit condition profiles to determine a change in conduit characteristics, and to determine that a failure has occurred in said pipeline when it is determined that there is a change in the pipeline condition profiles.

* * * * *